S. C. WOLFE.
TIRE PROTECTOR ANCHOR.
APPLICATION FILED JUNE 2, 1909.

938,537.

Patented Nov. 2, 1909.

Witnesses
E. Larson
S. E. Dodge

Inventor
S. C. Wolfe
By Beeler & Robb
Attorney

UNITED STATES PATENT OFFICE.

SAMUEL C. WOLFE, OF ANGOLA, INDIANA.

TIRE-PROTECTOR ANCHOR.

938,537.  Specification of Letters Patent.  Patented Nov. 2, 1909.

Application filed June 2, 1909. Serial No. 499,775.

*To all whom it may concern:*

Be it known that I, SAMUEL C. WOLFE, a citizen of the United States, residing at Angola, in the county of Steuben and State of Indiana, have invented certain new and useful Improvements in Tire-Protector Anchors, of which the following is a specification.

This invention relates to an improved form of anchor or tension device for use in connection with tire protectors, as set forth in my previous patent No. 898,714, dated September 15, 1908. As set forth in said previous patent, the protector or covering for the tire is secured in place by a pair of flat rings along the opposite margins thereof, said rings being connected across the felly by tension devices. In the present invention similar tension rings are employed in connection with the protector or covering for the tire, and a special form of tension device is used in connection therewith.

Figure 1:
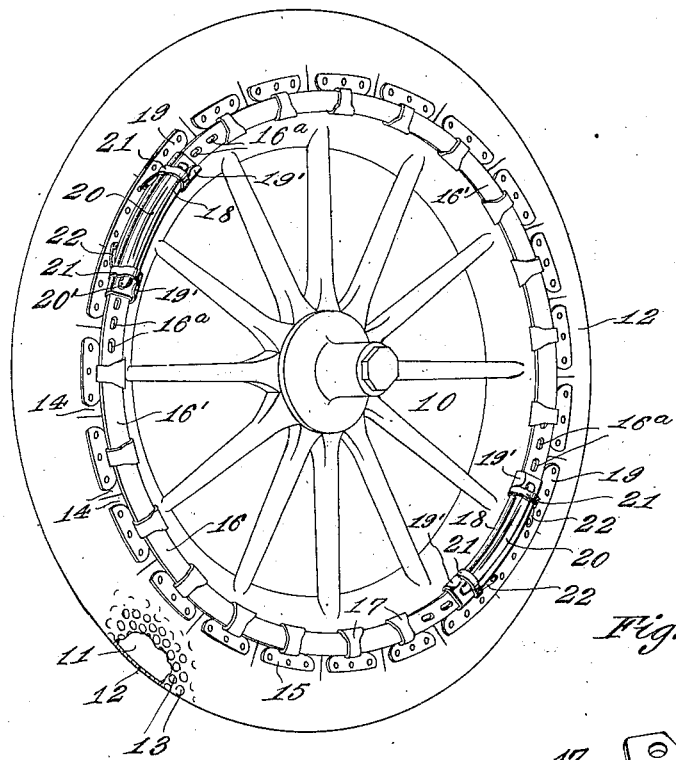
Figure 2:
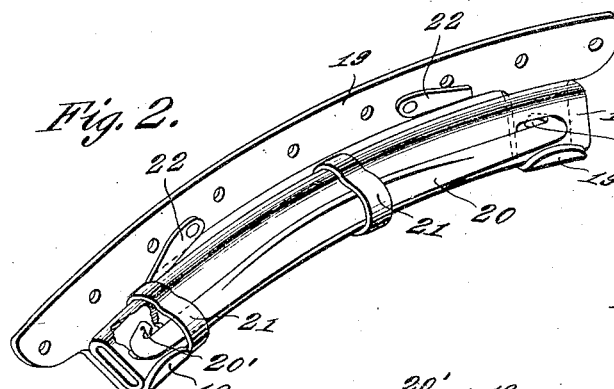
Figure 5:
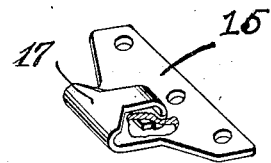
Figure 3:
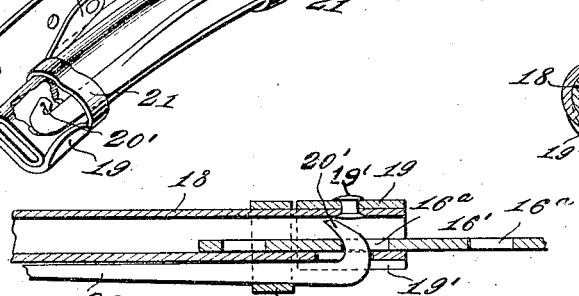
Figure 4:
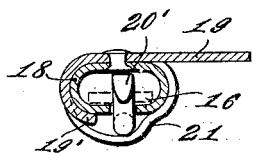

For a full understanding of the invention, reference is to be had to the following detail description and the accompanying drawings, in which:

Figure 1 is a perspective view of a wheel equipped with the improvement; Fig. 2 is a detail perspective of one of the ratchet connections; Fig. 3 is a longitudinal section of one end of the device of Fig. 2, Fig. 4 is a transverse section of the same, and Fig. 5 is a detail of a hook.

Throughout the following description and on the several figures of the drawings, similar parts are referred to by like reference characters.

Referring to the drawings, the wheel 10 equipped with a tire 11, is shown as being provided with an armor or tire protector 12, of any suitable material such as heavy leather, and provided with special protecting devices 13. The lateral edges of the protector body are slitted so as to enable the protector to snugly embrace the tire inclosed thereby.
Said lateral portions of the protector thus form a series of tongues or flaps 14 on each side of the tire. To each of said flaps is connected a metallic plate 15 adapted to receive the ring 16 either directly or by means of a hook 17 connected to the plate.

The ring 16 may be made in one piece if desired, as in the previous patent above referred to, but preferably it is made in two segments 16′ in order that the points of adjustment may be better distributed. The ends of the ring segments 16′ are provided with a plurality of transverse notches or holes 16ª, and the adjacent ends of the two segments are adapted to be interlocked in a ratchet connection of peculiar form. Said ratchet connection comprises a flattened tubular socket 18 rigidly and permanently connected to a strong metallic plate 19, preferably permanently connected to several of the flaps 14 of the protector. The plate 19 is provided preferably at its ends with a pair of hooks 19′ which embrace the said tubular socket 18 and to which the socket is permanently connected, as by rivets 19″. Between the main body of the plate 19 and the socket member 18 is a narrow space extending substantially the full length between the hooks 19′. The ends of the ring segments 16′ are adapted to be introduced into the opposite ends of the tubular member 18 and a pawl 20 carried by the tubular member automatically engages into the holes 16ª of said segments. The pawl 20 is provided at each end with a hook 20′ extending into the tubular member 18 from the outside and thence directed toward the center or middle portion of said member 18. The main portion of the pawl 20, between the hooks 20′, is flat and serves as a spring, as hereinafter fully set forth. Surrounding the tubular member and the pawl 20 are rings 21 which are slidable therealong by virtue of the space referred to above between the member 18 and plate 19.

In assembling the devices, the ring segments 16′ are placed in position in the hooks 17, the protector having been slipped around the tire in the usual manner, and the ends of the ring segments are then introduced into the ends of the members 18; the hooks of the pawls will then snap into the first holes 16ª thereof. A special tool, not shown, in the nature of a spanner is then applied to certain of the holes 16ª on the outside of the members 18 whereby the ends are caused to approach each other within the member 18, step by step, the hooks 20′ of the pawls snapping into the holes 16ª as they are reached. The rings 21 may be placed midway of the pawl during this operation, or they may both be caused to occupy a place at the ends of the pawl so as to enable a longer portion of the spring of the pawl to be utilized. After the adjustment has been completed, the rings 21 will be moved to the respective ends of the pawl at the opposite ends of the space between the member 18 and plate 19 and secured at such plates by any suitable means. As indicated in the drawings, the said rings 21 are held in place normally by means of dogs 22 connected to the plate 19 and adapted to be moved out of engagement with the rings when it is desired to change the adjustment of the tension device. It will be noted that the hooks 20' of the pawls are inclined on their inner faces and the holes 16ª of the ring segments are elongated so as to admit said hooks. The peculiar form of hooks serves to draw the ring segments snugly against the inner face of the members 18, thus preventing accidental displacement.

The ratchet connecting mechanism above described is neat in appearance, taking up comparatively little space, strong and reliable in use, and is such that it is practically impossible for the tension members to become loose after once adjusted, except by the application of the tool when it is desired to change the adjustment. It is not infrequent for tension devices for pneumatic tires to become loose when the tire becomes deflated for any reason, but with this device the protector and tension devices always remain in proper position.

The plates 15 are attached permanently to the protector and the hooks 17 are closed forming loops into and through which the segments 16' are slipped endwise. Thus it will be seen that it is impossible for the devices to become displaced after once being assembled, even though the tire should become deflated.

Having thus described this invention, what is claimed as new is:—

1. A pneumatic tire protector comprising an armored body portion, a series of flaps along its margin, a tension ring connected to said flaps, the ends of said ring being provided with transverse holes, a tension mechanism for said ring adapted to receive said ends and comprising a tubular member carried by some of said flaps, and a double ended pawl carried by said tubular member and extending into the interior thereof for coöperation with the ends of the tension ring introduced therein.

2. The herein described tension device for a pneumatic tire protector comprising a flat metallic ring the adjacent ends of which are perforated, a flattened tubular member to receive said ends, said tubular member having a hole in its side near each end, a double ended pawl carried by said tubular member, the ends of which project into said holes for coöperation with said ring ends, and means surrounding said pawl and tubular member and slidable therealong for maintaining the pawl in normal position.

3. In combination, a protector having a series of marginal flaps, a plurality of plates having integral closed hooks connected to said flaps, tension ring segments slipped endwise into said hooks, and ratchet mechanism including a double hooked pawl coöperating with the adjacent ends of the said ring segments.

In testimony whereof I affix my signature in presence of two witnesses.

SAMUEL C. WOLFE.

Witnesses:
EDW. WILLIAMSON,
JAMES R. NYCE.